United States Patent [19]

Crites

[11] 4,024,628
[45] May 24, 1977

[54] PROCESS FOR MANUFACTURING A TWO-POLE SOLID ROTOR

[76] Inventor: Donald M. Crites, 7223 Timber Lane, Falls Church, Va. 22046

[22] Filed: June 22, 1976

[21] Appl. No.: 698,663

[52] U.S. Cl. .................. 29/598; 310/168; 310/262; 310/263
[51] Int. Cl.² .................................. H02K 15/02
[58] Field of Search ............ 29/596, 598; 310/262, 310/263, 42, 216, 218, 168, 156

[56] References Cited
UNITED STATES PATENTS 3,321,652  5/1967  Opel .......................... 310/263 X
3,663,846  5/1972  Wagner et al. ............... 310/263 X Primary Examiner—Carl E. Hall
Attorney, Agent, or Firm—Nathan Edelberg

[57] ABSTRACT

A process for manufacturing a two-pole solid rotor comprises the steps of pre-forming non-magnetic material to produce a basic rotor with magnetic pole cavities, machining the rotor ends and press-fitting end caps of magnetic material thereon, filling the magnetic pole cavities by inserting magnetic material between the end caps either by fill-welding or by furnace brazing a pre-formed insert, and machining the rotor to finished size.

9 Claims, 10 Drawing Figures

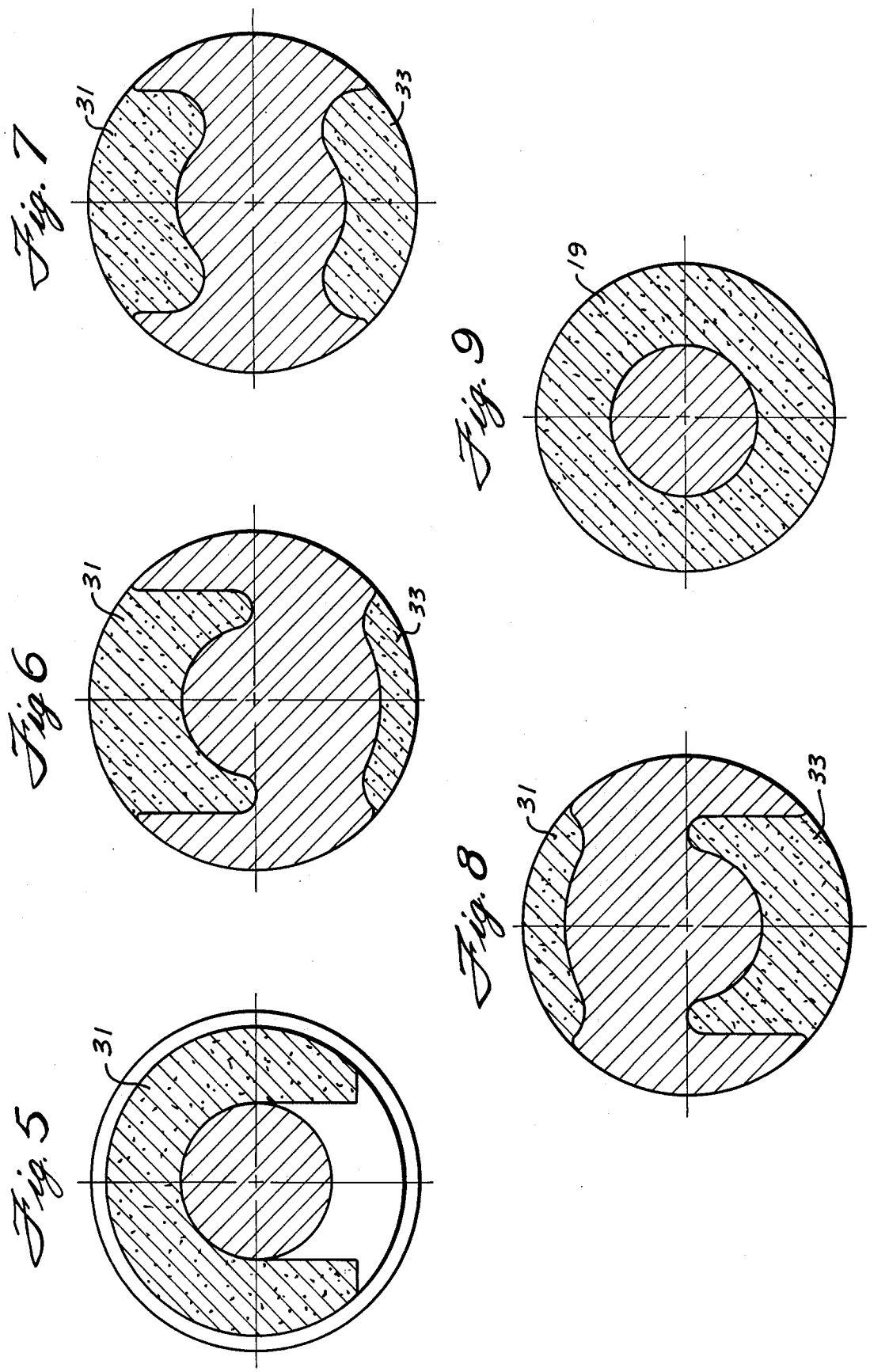

PROCESS FOR MANUFACTURING A TWO-POLE SOLID ROTOR

The invention described herein may be manufactured, used and licensed by or for the Government for Governmental purposes without the payment of any royalties thereon.

BACKGROUND OF THE INVENTION

Large electric motors and generators having rotors which are driven at high speeds present problems of structural integrity. It is important in the design of such machines to consider carefully the method of joining together materials in the rotor because of the large centrifugal forces acting at the high speeds of rotation encountered in some machines, such as those having turbine driven rotors. The use of bolts or rivets results in high unit stresses requiring very large botls or rivets to provide the necessary holding strength. The large holes in the pole pieces to accommodate the bolts or rivets disrupts the symmetry and reduces the efficiency of magnetic operation.

It has been a common practice to fabricate high speed rotors by welding together separately fabricated parts to avoid the disadvantages of bolted or riveted assemblies. The use of welding, however, introduces other problems. To achieve structural integrity in welded assemblies the welding must be done with extreme care and the structure must be designed so that a practical weld depth is maintained. These considerations generally result in a manufacturing process of many steps involving large amounts of time and labor.

SUMMARY OF THE INVENTION

The present invention overcomes the disadvantages of the methods of the prior art in a process consisting of fewer steps and resulting in a product which is inherently stronger and less susceptible to failure. The basic step of the invention is the pre-forming of a unitary rotor blank fromm a non-magnetic material. The rotor blank, which includes an integral rotor shaft, contains a plurality of cavities to receive magnetic material forming the magnetic poles. The non-magnetic material of the rotor blank between the cavities serves to separate the magnetic poles.

After the rotor blank is formed, the ends are machined and then turned to receive end caps of magnetic material. An end cap is press-fitted on each end of the rotor blank, and the space between the end caps, including the plurality of cavities, is fill-welded with magnetic material to form an integral structure. The rotor is then machined to finished size.

An alternative method replaces the step of fill-welding with the steps of pre-forming a pair of magnetic pole inserts and furnace-brazing the inserts in the cavities to form a unitary structure prior to machining to finished size.

BRIEF DESCRIPTION OF THE DRAWINGS

FIG. 3A is a perspective view of a pre-formed magnetic pole insert;

FIG. 5 is a cross-sectional view of the finished rotor taken along line 5—5 of FIG. 4;

FIG. 6 is a cross-sectional view of the finished rotor taken along line 6—6 of FIG. 4;

FIG. 7 is a cross-sectional view of the finished rotor taken along line 7—7 of FIG. 4;

FIG. 8 is a cross-sectional view of the finished rotor taken along line 8—8 of FIG. 4; and FIG. 9 is a cross-sectional view of the finished rotor taken along line 9—9 of FIG. 4.

DESCRIPTION OF THE PREFERRED EMBODIMENTS

Figure 1:
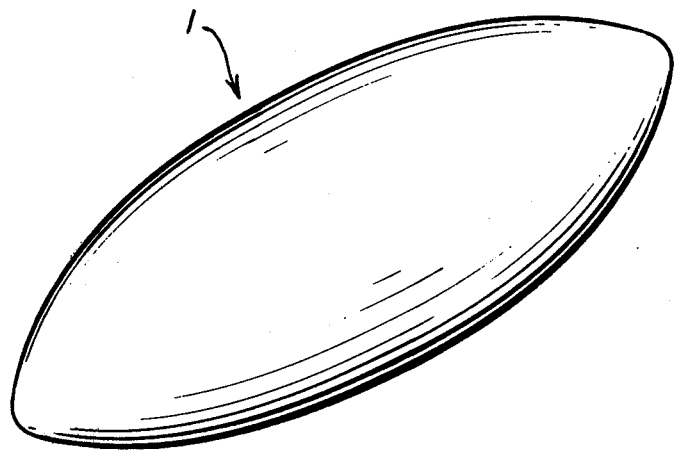
FIG. 1 is perspective view of billet used to form the rotor blank.

The invention will be understood more readily by referring to FIG. 1 which is a perspective view of a billet 1 used to form the rotor blank. The billet 1 is formed from a non-magnetic, high-alloy steel such as Inconel. The billet 1 is heated and subjected to a forging operation, typically involving the use of dies, to produce the intermediate rotor form shown in FIG. 2.

Figure 2:
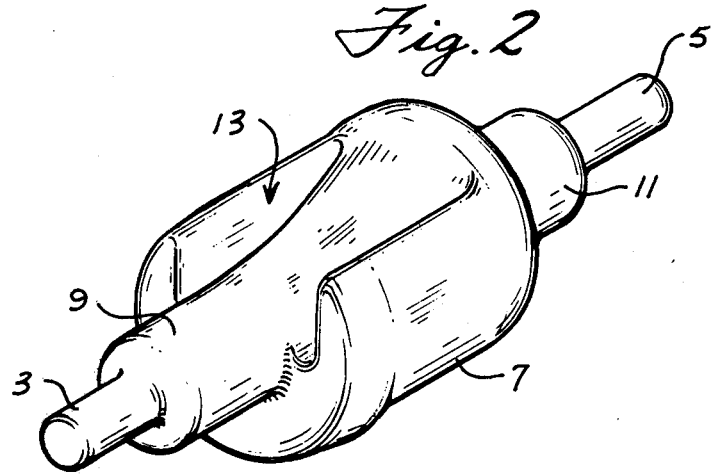
FIG. 2 is a perspective view of rotor blank after the forging operation.

The rotor of FIG. 2 is an integral structure comprising shaft projections 3 and 5. The main body 7 of the rotor has end portions 9 and 11 and diametrically disposed cavities, one of which, 13, is shown in FIG. 2. The intermediate rotor blank of FIG. 2 is slightly oversized to permit machining and welding operations to be performed before an accurate sizing is accomplished.

Figure 3:
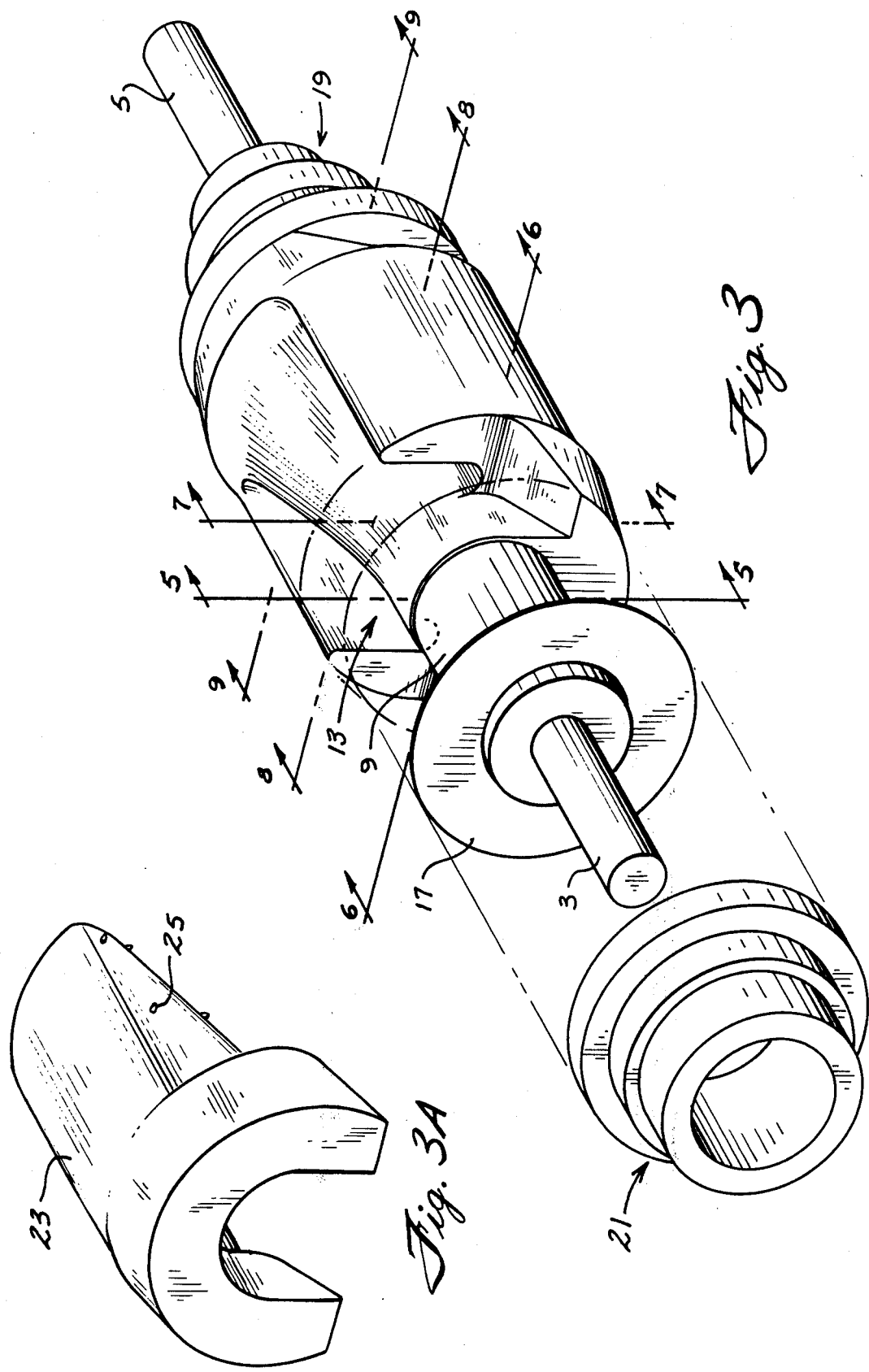
FIG. 3 is an exploded perspective view of the rotor blank with end caps prior to the fill-welding operation.

FIG. 3 is an exploded perspective view of the rotor blank with fitted end caps in position prior to inserting the magnetic material in the cavities. The structure of FIG. 3 is attained by machining the intermediate rotor structure of FIG. 2 to accurately size shaft projections 3 and 5 and end portions 9 and 11.

End cap members 19 and 21 are formed of magnetic material and positioned over end portions 5 and 9, respectively, by a press-fitting operation. When the end caps 19 and 21 are in position, the cavity 13 and its complementary cavity on the underside of the rotor (not shown in FIG. 3) are ready to receive fillings of magnetic material which with the end caps 19 and 21, serve as the two magnetic poles of the rotor separated by the non-magnetic material of the basic rotor blank. The cavities may be filled with magnetic material by a fill-welding operation, or by the use of a pre-formed insert such as shown in FIG. 3A.

FIG. 3A is a perspective view of a pre-formed magnetic pole insert 23 with a plurality of projections 25 disposed about its sides and undersurface. Insert 23 is slightly smaller than cavity 13, and the surfaces of insert 23 are uniformly spaced from the surfaces of cavity 13 by the projections 25. The purposes of the projections 25 is to permit a uniform layer of brazing powder to be applied between the surfaces of insert 23 and cavity 13 to allow the structure to be made integral by means of the furnace brazing operation. A brazing ring 17 is positioned between the insert 23 and the end cap member 21 to assure uniform spacing during the brazing operation. In the brazing operation the insert 23 is fused both to the rotor blank and to the end cap member 21.

The integrity of the magnetic circuit of the rotor must be preserved during construction. If the cavities of the rotor are filled with magnetic material by a fill-welding operation, there is no gap between the magnetic material within the cavity and the magnetic material of the end cap member. However, if a pre-formed insert is utilized, the brazing material between the insert and the end cap member can have a deleterious effect upon the magnetic circuit if the material is not magnetic in nature. When non-magnetic brazing material is utilized, the gap between the end cap and the magnetic pole insert must be kept less than 5% of the accumulated gap, where the accumulated gap is defined as the sum of the gaps between the stator and rotor and between the rotor and the end bell of the machine in which the rotor is to operate.

Figure 4:
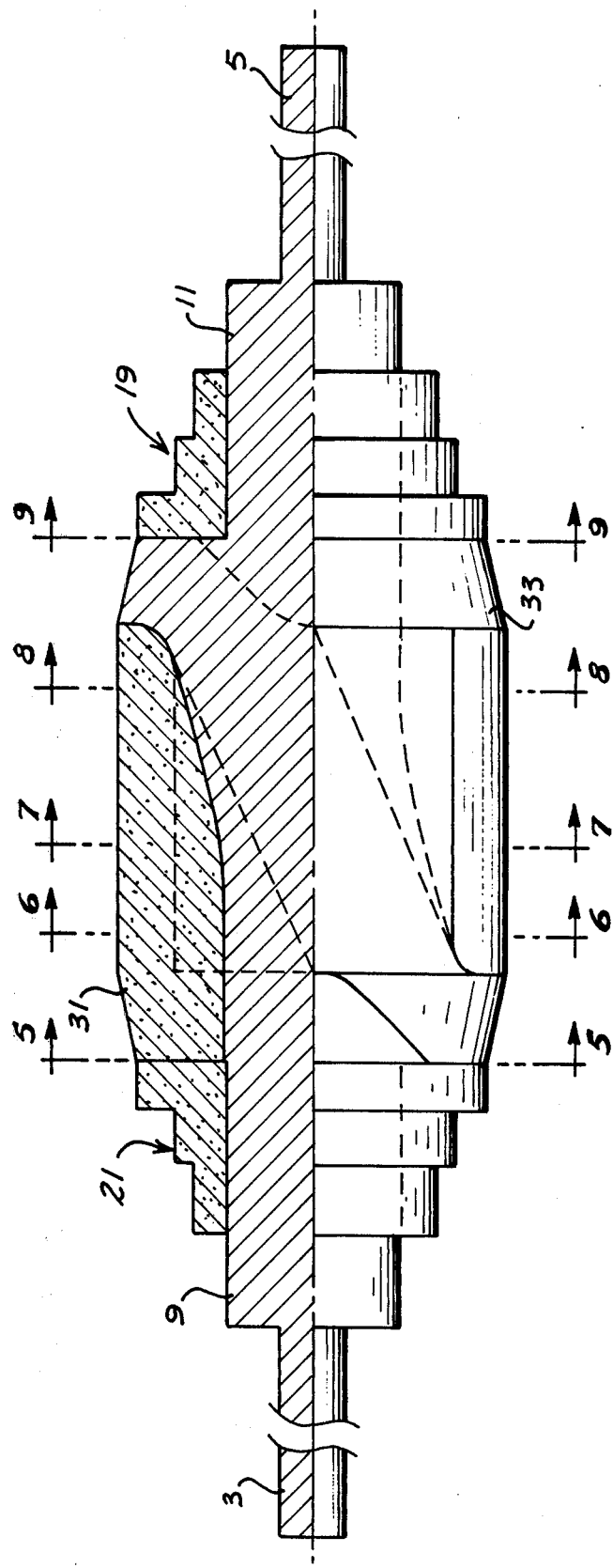
FIG. 4 is a view of the finished rotor in partial section.

FIG. 4 is a view of the finished rotor in partial section after the machining operations have been completed. In this view the magnetic pole members 31 and 33, which occupy the rotor cavities, are easily seen. the magnetic circuit is substantially continuous through pole member 31 and end cap 21 and pole member 33 and end cap 19.

FIGS. 5 through 9 are cross-sectional views of the finished rotor taken along lines 5—5, 6—6, 7—7, 8—8 and 9—9, respectively. These views illustrate the shape of the magnetic pole inserts in position along the shaft of the finished rotor.

It will be appreciated that the rotor of FIG. 2 could be pre-formed by casting as well as by forging. In like fashion the pre-formed insert shown in FIG. 3 could be cast.

What is claimed is:

1. A process for manufacturing a two-pole solid rotor comprising the steps of
    a. pre-forming a rotor blank with cavities therein from a non-magnetic metal,
    b. machining the rotor blank to define a pair of cavities and a pair of end cap receiving surfaces,
    c. fitting end caps on the end cap receiving surfaces,
    d. filling the pair of cavities by inserting magnetic material therein,
    e. machining the rotor to finished size.

2. The combination according to claim 1 wherein the step of pre-forming comprises forging.

3. The combination according to claim 1 wherein the step of pre-forming comprises casting.

4. The combination according to claim 1 wherein the step of filling comprises fill-welding.

5. The combination according to claim 1 wherein the step of filling comprises placing a pre-formed magnetic pole in each of the cavities and furnace-brazing the combination to produce a solid rotor.

6. A process for manufacturing a two-pole solid rotor comprising the steps of
    a. heating a billet of non-magnetic material,
    b. forging a rotor blank from the billet to form cavities therein,
    c. machining the rotor blank to define a pair of cavities and a pair of end cap receiving surfaces,
    d. forming end caps from magnetic material,
    e. fitting an end cap on each of the end caps receiving surfaces,
    f. filling the pair of cavities by inserting magnetic material between the end caps to form an oversize solid rotor,
    g. machining the rotor blank to finished size.

7. The combination according to claim 6 wherein the steps of filling comprises fill-welding.

8. The combination according to claim 6 wherein the step of filling comprises placing a pre-formed magnetic pole in each of the cavities and furnace-brazing the combination to produce a solid rotor.

9. A process for manufacturing a two-pole solid rotor comprising the steps of
    a. melting non-magnetic material for a first casting melt,
    b. casting a rotor blank with cavities therein using said first melt,
    c. machining the rotor blank to define a pair of cavities and a pair of end cap receiving surfaces,
    d. melting magnetic material for a second casting melt,
    e. casting pole pieces, using said second melt to fill the pair of cavities in the rotor,
    f. casting end caps using said second melt,
    g. fitting end caps on the end cap receiving surfaces,
    h. inserting the pole pieces in the rotor cavities,
    i. furnace-brazing the rotor to produce a solid rotor,
    j. machining the rotor to finished size.

* * * * *